US011081751B2

(12) United States Patent
Rowcotsky et al.

(10) Patent No.: US 11,081,751 B2
(45) Date of Patent: Aug. 3, 2021

(54) BATTERY COVER AND METHOD OF CONSTRUCTION THEREOF

(71) Applicant: FEDERAL-MOGUL POWERTRAIN LLC, Southfield, MI (US)

(72) Inventors: Daniel A. Rowcotsky, Dreshar, PA (US); John Burdy, Elverson, PA (US); Cassie Malloy, Trappe, PA (US); Amanda Schafer, Exton, PA (US); Christopher J. Pinkow, Garnet Valley, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 172 days.

(21) Appl. No.: 16/181,118

(22) Filed: Nov. 5, 2018

(65) Prior Publication Data
US 2019/0140224 A1 May 9, 2019

Related U.S. Application Data

(60) Provisional application No. 62/582,140, filed on Nov. 6, 2017.

(51) Int. Cl.
H01M 2/04 (2006.01)
H01M 50/148 (2021.01)
H01M 50/10 (2021.01)
H01M 50/124 (2021.01)
H01M 50/155 (2021.01)
H01G 11/78 (2013.01)

(52) U.S. Cl.
CPC ......... *H01M 50/148* (2021.01); *H01M 50/10* (2021.01); *H01M 50/124* (2021.01); *H01M 50/155* (2021.01); *H01G 11/78* (2013.01)

(58) Field of Classification Search
CPC ............. H01M 2/0456; H01M 2/0287; H01M 2/0237; H01M 2/02; H01M 2/0482; H01M 2/0486; H01M 2220/20; H01M 2/1094; H01G 11/78; Y02E 60/10
See application file for complete search history.

(56) References Cited

U.S. PATENT DOCUMENTS

| | | | |
|---|---|---|---|
| 3,707,433 A | 12/1972 | Clough et al. | |
| 5,106,670 A * | 4/1992 | Wyslotsky | B65B 31/021 220/359.3 |
| 6,433,273 B1 * | 8/2002 | Kenyon | B32B 5/02 174/11 OR |
| 9,334,591 B2 | 5/2016 | Harris et al. | |
| 9,793,520 B2 | 10/2017 | Knapp et al. | |
| 2005/0014061 A1 | 1/2005 | Ahn | |
| 2005/0202237 A1 | 9/2005 | Fryberger, Jr. et al. | |
| 2006/0068278 A1 | 3/2006 | Bloom et al. | |
| 2007/0245664 A1 * | 10/2007 | Orologio | B32B 27/06 52/508 |
| 2011/0305878 A1 | 12/2011 | Gladfelter et al. | |
| 2015/0364730 A1 | 12/2015 | Glaspie | |
| 2016/0064706 A1 * | 3/2016 | Burdy | H01M 10/613 429/179 |
| 2016/0099442 A1 | 4/2016 | Kanayama | |
| 2016/0226033 A1 | 8/2016 | Harris et al. | |
| 2020/0001405 A1 * | 1/2020 | Murphy | B32B 15/20 |

FOREIGN PATENT DOCUMENTS

GB 2075913 A 11/1981
JP 2008062413 3/2008

OTHER PUBLICATIONS

International Search Report, dated Feb. 4, 2019 (PCT/US2018/059295).

* cited by examiner

*Primary Examiner* — Muhammad S Siddiquee
(74) *Attorney, Agent, or Firm* — Robert L. Stearns; Dickinson Wright, PLLC

(57) ABSTRACT

A flexible, insulative battery cover and method of construction thereof are provided. The batter cover includes a flexible, tubular wall circumferentially bounding a cavity extending between a bottom end and a top end. The flexible, tubular wall has a composite outermost layer, a first thermoplastic innermost layer, and a nonwoven intermediate layer. The nonwoven intermediate layer is sandwiched between the composite outermost layer and the first thermoplastic innermost layer. The composite outermost layer includes a reflective outermost thermoplastic layer, a second thermoplastic innermost layer and a metal layer sandwiched between the reflective outermost thermoplastic layer and the second thermoplastic innermost layer.

15 Claims, 2 Drawing Sheets

BATTERY COVER AND METHOD OF CONSTRUCTION THEREOF

CROSS-REFERENCE TO RELATED APPLICATION

This application claims the benefit of U.S. Provisional Application Ser. No. 62/582,140, filed Nov. 6, 2017, which is incorporated herein by reference in its entirety.

BACKGROUND OF THE INVENTION

1. Technical Field

This invention relates generally to battery covers, and more particularly to flexible insulative battery covers.

2. Related Art

A thermal insulator is generally needed to insulate a battery, such as a motor vehicle battery, from degradation due to thermal affects. Rigid plastic covers are commonly used to protect batteries; however, they are relatively heavy, and in addition, typically do not protect a battery against thermal conditions. Accordingly, rigid plastic covers generally do not provide the degree of insulation required to protect the battery against thermal degradation, thereby causing the useful life of the battery to be reduced. In addition, rigid plastic battery covers are inflexible, generally bulky and cumbersome to ship, and in addition, occupy valuable storage space, thereby increasing shipping and inventory cost.

SUMMARY OF THE DISCLOSURE

According to one aspect of the disclosure, a flexible one piece, insulative battery cover is provided. The battery cover includes a flexible, tubular wall that circumferentially bounds a cavity extending between a bottom end and a top end. The flexible, tubular wall has a composite outermost layer, a first thermoplastic innermost layer, and an insulative nonwoven intermediate layer sandwiched between the composite outermost layer and the first thermoplastic innermost layer. The composite outermost layer includes a reflective outermost thermoplastic layer, a second thermoplastic innermost layer, and a metal layer sandwiched between the reflective outermost thermoplastic layer and the second thermoplastic innermost layer.

In accordance with another aspect, a first width is defined from the bottom end to the top end, wherein the nonwoven intermediate layer has a second width that is less than the first width.

In accordance with another aspect, the second thermoplastic innermost layer of the composite outermost layer and the first thermoplastic innermost layer are bonded directly to one another via welds joints formed adjacent the bottom and top ends.

In accordance with another aspect, the weld joints formed between the second thermoplastic innermost layer of the composite outermost layer and the first thermoplastic innermost layer do not include material of the nonwoven intermediate layer.

In accordance with another aspect, the reflective outermost thermoplastic layer can be adhered directly to the metal layer and the second thermoplastic innermost layer can be adhered directly to the metal layer.

In accordance with another aspect, the reflective outermost thermoplastic layer can be provided as a metal foil.

In accordance with another aspect, the metal foil can be impervious.

In accordance with another aspect, the metal foil can be provided having a thickness between about 0.0003"-0.0015".

In accordance with another aspect, the second thermoplastic innermost layer of the composite outermost layer can be provided as a nonwoven material, such as having a thickness between about 1-3 mm.

In accordance with another aspect, the first thermoplastic innermost layer can be provided as a porous scrim layer.

In accordance with another aspect, the flexible, tubular wall can be formed having a single weld seam extending from the bottom end to the top end to form the wall as being circumferentially continuous.

In accordance with another aspect, the flexible, tubular wall can be provided having a plurality of living hinges to facilitate folding the wall for shipping and stowing purposes.

In accordance with another aspect, the reflective outermost thermoplastic layer can be provided as a metallized thermoplastic layer.

In accordance with another aspect, a method of constructing a battery cover is provided. The method includes forming a composite outermost layer including a reflective outermost thermoplastic layer, a second thermoplastic innermost layer, and metal layer sandwiched between the reflective outermost thermoplastic layer and the second thermoplastic innermost layer. Further, providing a first thermoplastic innermost layer and providing a nonwoven intermediate layer. Then, sandwiching the nonwoven intermediate layer between the composite outermost layer and the first thermoplastic innermost layer and bonding the composite outermost layer to the first thermoplastic innermost layer to form a flat wall. Further, fixing opposite edges of the wall to one another to form a flexible, tubular wall extending between a top end and a bottom end.

In accordance with another aspect, the method can further include providing the nonwoven intermediate layer having a width that is less than a width extending from the bottom end to the top end.

In accordance with another aspect, the method can further include bonding the first thermoplastic innermost layer directly to the composite outermost layer adjacent the bottom end and adjacent the top end.

In accordance with another aspect, the method can further include performing the bonding of the first thermoplastic innermost layer to the composite outermost layer via an ultrasonic welding process.

In accordance with another aspect, the method can further include keeping the nonwoven intermediate layer free from a weld joint formed by the ultrasonic welding process, thereby enhancing the integrity of the weld joint, increasing the process speed of the welding process, and thus, increasing the rate of production and decreasing the cost associated therewith.

In accordance with another aspect, the method can further include adhering the reflective outermost thermoplastic layer to the metal layer and adhering the second thermoplastic innermost layer to the metal layer.

In accordance with another aspect, the method can further include providing the second thermoplastic innermost layer of the composite outermost layer as a nonwoven material.

In accordance with another aspect, the method can further include providing the first thermoplastic innermost layer as a porous thermoplastic material containing scrim layer.

In accordance with another aspect, the method can further include forming a plurality of living hinges in the flat wall prior to forming the flexible, tubular wall.

In accordance with another aspect, the method can further include providing the reflective outermost thermoplastic layer as a metal foil.

In accordance with another aspect, the metal foil can be provided as being impervious.

In accordance with another aspect, the metal foil can be provided as having a thickness between about 0.0003"-0.0015".

BRIEF DESCRIPTION OF THE DRAWINGS

These and other aspects, features and advantages of the present disclosure will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
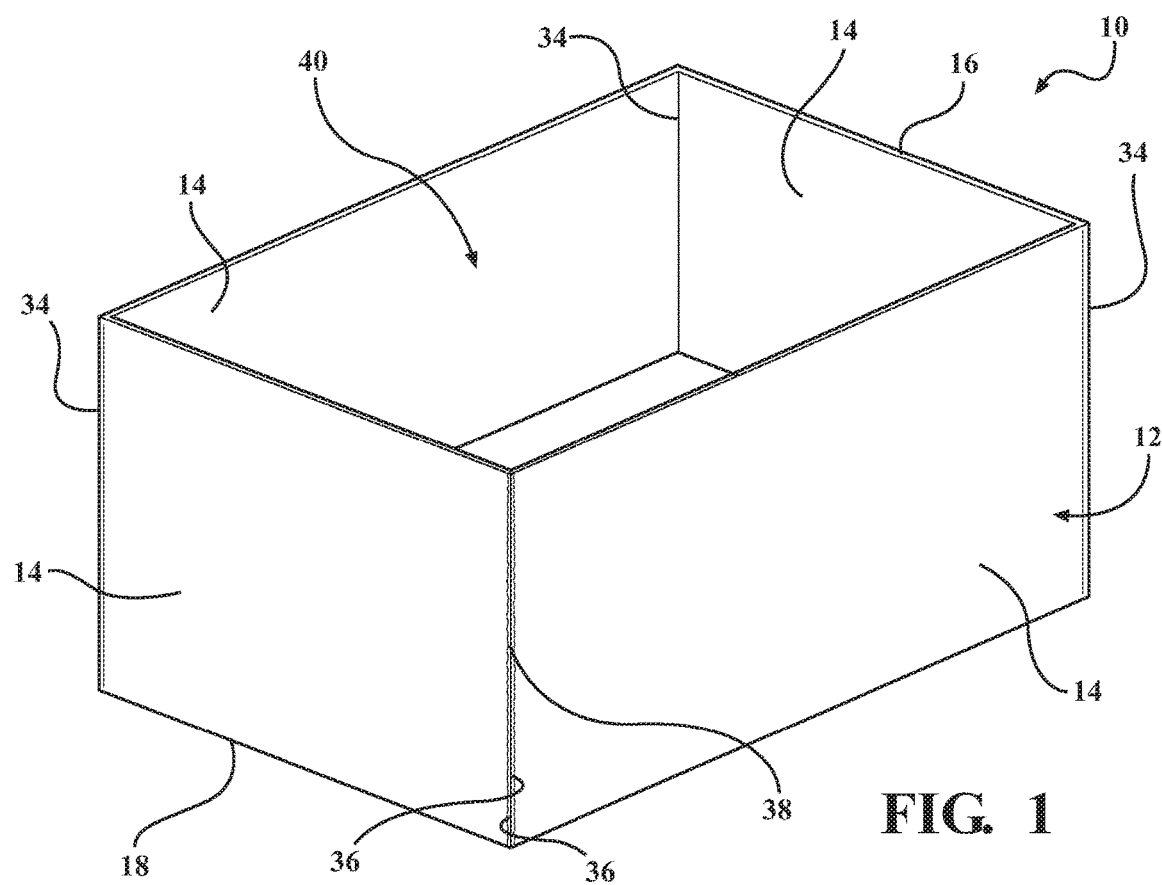
FIG. 1 is a perspective view of an insulative battery cover constructed in accordance with one aspect of the disclosure shown.
Figure 2:
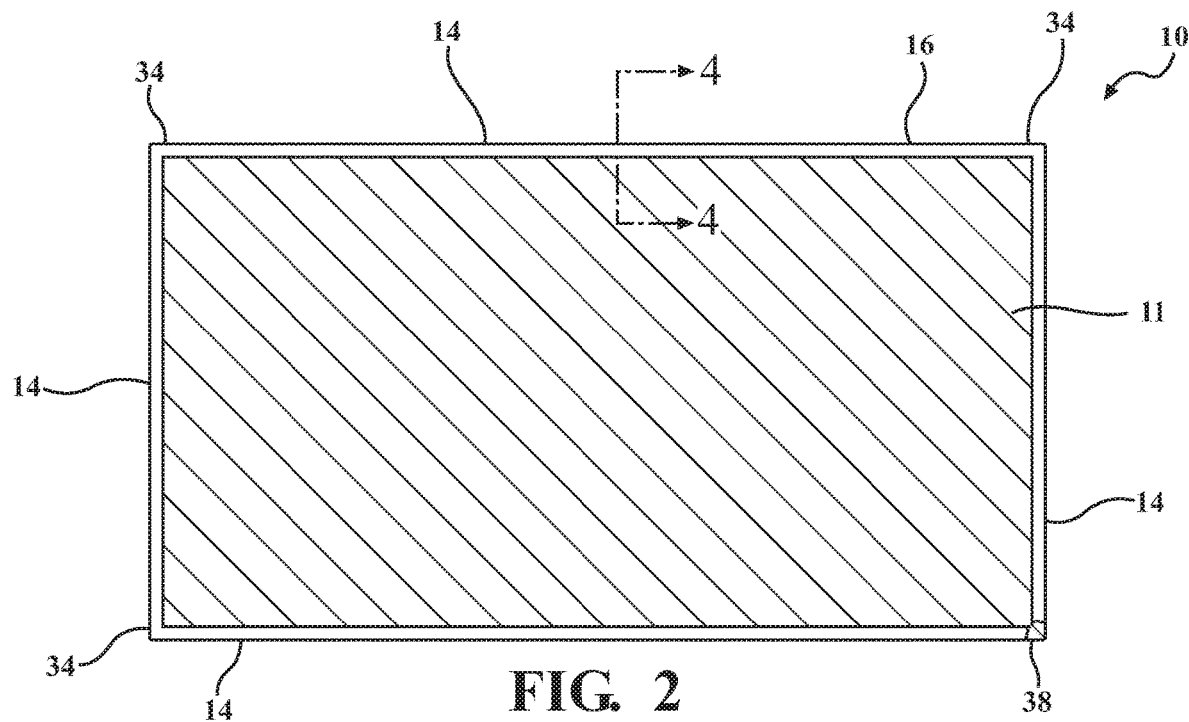
FIG. 2 is top view of the battery cover of FIG. 1.
Figure 4:
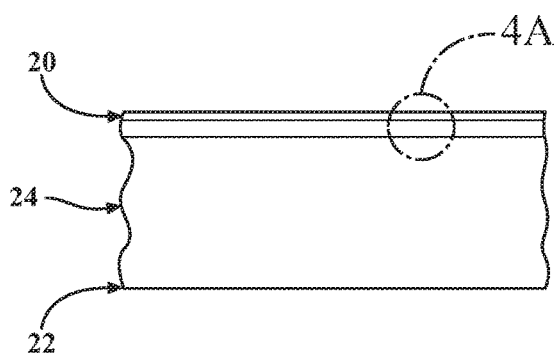
FIG. 4 is a cross-sectional view taken generally along the line 4-4 of FIG. 2 showing a multilayered construction of the wall of the battery cover of FIGS. 1 and 2.

Referring in more detail to the drawings, FIGS. 1 and 2 illustrates a flexible, textile battery cover, referred to hereafter as cover 10, constructed in accordance with one aspect of the disclosure for receipt of a motor vehicle battery 11 to form an assembly providing thermal protection about the peripheral sides of the battery 11. The cover 10 is formed having a flexible, one-piece wall 12, such that the cover 10 can be handled and disposed about the battery 11 as a single piece of material. The wall 12 is formed having tubular configured sidewalls 14, and thus, is circumferentially continuous about its peripheral sides 14 and extends between a top end 16 and an opposite bottom end 18. The wall 12, as best shown in FIG. 4, has a composite outermost layer 20, a first thermoplastic innermost layer 22, and a nonwoven intermediate layer 24 sandwiched between the composite outermost layer 20 and the first thermoplastic innermost layer 22. The synergies provided between the layers 20, 22, 24 enhance the ability of the cover 10 to perform as intended (such as by maintaining battery acid temperature within a manufacturer's recommended temperature range, while also being resistant to degradation over a long and useful life), thereby enhancing the useful life of the vehicle battery 11, while also being economical in manufacture, thereby decreasing the costs associated therewith, while also being lightweight and foldable for ease of handling, shipping and stowing.

Figure 4A:
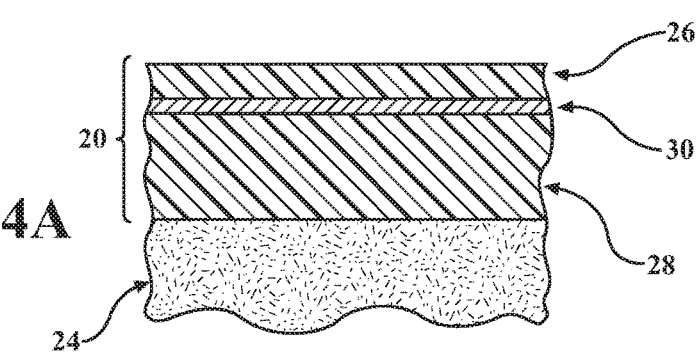
FIG. 4A is an enlarged view of the encircled area 4A of FIG. 4.
Figure 5:
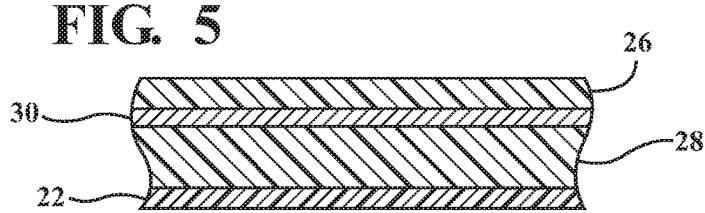
FIG. 5 is a cross-sectional view taken generally along the line 5-5 of FIG. 3.

The composite outermost layer 20, as best shown in FIG. 4A, includes a reflective outermost thermoplastic layer 26, a second thermoplastic innermost layer 28, and an impervious reflective metal layer 30 sandwiched between the metallized outermost thermoplastic layer 26 and the second thermoplastic innermost layer 28.

The nonwoven intermediate layer 24 can be constructed from any suitable insulative materials, and in accordance with one aspect, can be constructed from regenerated fibers or green materials, with the green materials being provided from at least one of a blend of comminuted cardboard, natural fibers, recycled materials and/or waste stream materials. The nonwoven intermediate layer 24 can further include polyester-based fibers, heat-settable fibers and/or heat-meltable textile fibers, though not necessary in one presently preferred embodiment, thereby reducing the cost associated therewith by being able to avoid the inclusion of typically more expensive heat-settable fibers and/or heat-meltable textile fibers due to the ability to capture the nonwoven intermediate layer 24 between the first thermoplastic innermost layer 22 and the second thermoplastic innermost layer 28. The natural fibers can be provided from any suitable natural fibers, such as jute, kenaf, hemp and the like, and also from any suitable recycled materials and/or waste stream materials.

If heat-meltable and/or heat-settable material is included in the nonwoven intermediate layer 24, it can be provided, for example, as a low temperature melt polymeric material, such as fibers of polyethylene, PET or Nylon. It should be recognized that other low melt polymeric materials could be used, such as thermoplastic bi-component fibers whose outer sheath, such as polypropylene, for example, melts when heated above its melting point, while the inner core can be a heat-settable material than retains a heat-set shape. The low melt material, when melted, fuses with the mixture of any textile natural fibers present and the cardboard fibers and with remaining binders from the recycled cardboard materials. As an example, the melting point of the outer portion of a PET low melt bi-component fiber may be approximately 110° C.-180° C. as compared to the core melting at 250° C. Persons skilled in the art will recognize that other coatings or fillers and filler fibers may be used in place of low melt fibers to achieve the desired result.

The process for constructing the nonwoven intermediate layer 24 includes mixing or blending the selected nonwoven materials, which as discussed, can include green materials, e.g. natural fibers, with the heat-meltable fibers optionally included, and forming a web of the blended materials. The webbing process, which may be performed in an air-lay process, for example, on a Rando machine, or in a carding process, forms a homogenously mixed natural fiber/meltable fiber mat or web, with the green material and fibers being randomly oriented.

Then, upon forming the web, the web is consolidated to bind the green and fibrous materials to one another, such as via a mechanical, chemical and/or thermal process, if suitable. For example, the web can be heated, such as in an oven, to a temperature suitable to at least partially melt the heat-meltable fibers, if provided, thereby thermally bonding the blend of green materials with the heat-meltable fibers. Otherwise, or in addition, the web can be subjected to a needling process to entwine the green materials and fibers with one another and/or to a chemical process wherein a chemical binder is utilized to bond the green materials and fibers together. Regardless of the consolidating process selected, the web is formed into a nonwoven sheet of intermixed and intertwined fibers, wherein the nonwoven sheet attains a desired thickness.

Figure 3:
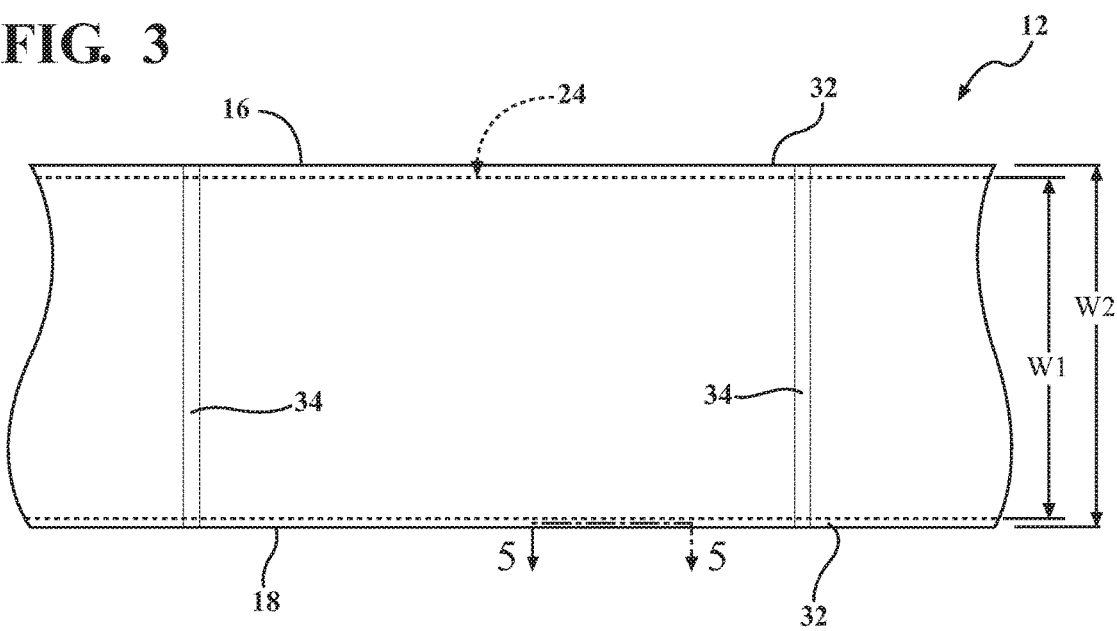
FIG. 3 is a plan view of a flat sheet of material shown in an initial fabrication state, after forming living hinges therein and prior to cutting, folding and welding the material into the configuration of a wall of the battery cover of FIGS. 1 and 2.

Then, upon forming the nonwoven intermediate layer 24, the composite outermost layer 20 and first thermoplastic layer 22 can be bonded to one another on opposite sides of the nonwoven intermediate layer 24 to capture and encapsulate the nonwoven intermediate layer 24 in sandwiched relation therebetween to substantially complete the formation of the material of the wall 12. To facilitate bonding the composite outermost layer 20 and first thermoplastic layer 22 to one another, the nonwoven intermediate layer 24 can be provided having a first reduced width W1 relative to a second width W2 defined by the opposite top and bottom ends 16, 18, as shown in FIG. 3. As such, a bonded joint, such as an ultrasonic weld joint 32, by way of example and without limitation, can be readily formed between the second thermoplastic innermost layer 28 of the composite outermost layer 20 and the first thermoplastic innermost layer 22, with the weld joint 32 being free of material from the nonwoven intermediate layer 24. As such, with less material having to be welded, the process is streamline and made more efficient, and thus, the cost associate therewith is reduced and the rate of production is increased. Further yet, in addition to the bonding process of forming the wall 12, living hinges 34 can be formed in the wall 12, as desired to create desire locations for folding the wall 12. Then, upon cutting the wall 12 to the desire size, thereby forming free edges or sides 36, the planar, flat wall 12 can be readily folded appropriately, such as via living hinges 34, whereupon the free edges 36 can be brought into abutting relation with one another and then fixed to one another under at a bonded seam 38, such as via bonding under the application of suitable heat, e.g. welded, such as in an ultrasonic welding process, or by a suitable adhesive or fastener, for example, to form a circumferentially continuous, tubular wall structure of the cover 10 bounding a cavity 40 suitably sized for receipt of the intended vehicle battery. As such, the wall 12 is configured having its circumferentially continuous peripheral sides 14 extending between the opposite top and bottom ends 16, 18.

In accordance with further aspects, the second thermoplastic innermost layer 28 of the composite outermost layer 20 can be provided as a nonwoven material, wherein the nonwoven material includes at least some thermoplastic constituent ingredients. It is to be recognized the entirety of the material within the nonwoven material could be provided as being thermoplastic material, if desired.

In accordance with yet another aspect, the impervious reflective metal layer 30 can be provided as a metal foil, such as an aluminum foil having a thickness between about 0.0003"-0.0015", by way of example and without limitation.

In accordance with yet another aspect, the first thermoplastic innermost layer 22 can be provided as a porous scrim layer, wherein the material of the scrim layer 22 includes at least some thermoplastic constituent ingredients, though it is to be recognized that the entirety of the material within the scrim layer 22 could be provided as being thermoplastic material, if desired.

In addition to the synergies discussed above, further synergies will be recognized by those skilled in the art, particularly in use of the cover 10. For example, the nonwoven second thermoplastic innermost layer 28, aside from enhancing manufacturability by facilitating ultrasonic welding of the composite layer 20 to the first thermoplastic innermost layer 22, the nonwoven second thermoplastic innermost layer 28 further reduces the generation of noise by acting as a dampener against the reflective metal layer 28, while also inhibiting wrinkling of the reflective metal layer 28. Further yet, with the reflective outermost thermoplastic layer 26, such as a flexible, metalized thermoplastic layer 26, such as a metalized layer of Mylar, by way of example and without limitation, and the reflective metal layer 30 each being solid, impervious sheets of flexible material, they prevent the flow of hot gasses therethrough, thereby acting to further insulate the battery 11 against the effects of a relatively hot engine compartment environment. Further yet, the first thermoplastic innermost layer 22 also acts to shield the nonwoven intermediate layer 24 against contact with fluids, such as water, thereby allowing the nonwoven intermediate layer 24 to remain dry and function as an insulator, as intended, over a long and useful life.

Obviously, many modifications and variations of the present invention are possible in light of the above teachings. It is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A flexible, insulative battery cover, comprising:
   a flexible, tubular wall circumferentially bounding a cavity extending between a bottom end and a top end, said flexible, tubular wall having a composite outermost layer, a first thermoplastic innermost layer, and a nonwoven intermediate layer sandwiched between said composite outermost layer and said first thermoplastic innermost layer; and
   wherein said composite outermost layer includes a reflective outermost thermoplastic layer, a second thermoplastic innermost layer, and a metal layer sandwiched between said reflective outermost thermoplastic layer and said second thermoplastic innermost layer.

2. The flexible, insulative battery cover of claim 1, wherein a first width is defined from said bottom end to said top end, wherein said nonwoven intermediate layer has a second width that is less than said first width.

3. The flexible, insulative battery cover of claim 1, wherein said second thermoplastic innermost layer of said composite outermost layer and said first thermoplastic innermost layer are bonded directly to one another via a weld joint formed adjacent said bottom end and via a weld joint formed adjacent said top end.

4. The flexible, insulative battery cover of claim 3, wherein said weld joints are void of material of said nonwoven intermediate layer.

5. The flexible, insulative battery cover of claim 4, wherein said nonwoven intermediate layer is contained between said weld joints.

6. The flexible, insulative battery cover of claim 1, wherein said reflective outermost thermoplastic layer is adhered to said metal layer and said second thermoplastic innermost layer is adhered to said metal layer.

7. The flexible, insulative battery cover of claim 1, wherein said second thermoplastic innermost layer is a nonwoven material.

8. The flexible, insulative battery cover of claim 1, wherein said metal layer is a metal foil.

9. The flexible, insulative battery cover of claim 7, wherein said metal foil has a thickness between about 0.0003"-0.0015".

10. The flexible, insulative battery cover of claim 7, wherein said metal foil is impervious.

11. The flexible, insulative battery cover of claim 1, wherein said first thermoplastic innermost layer is a porous, nonwoven scrim layer.

12. The flexible, insulative battery cover of claim 1, wherein said flexible, tubular wall has a weld seam extending from said bottom end to said top end.

13. The flexible, insulative battery cover of claim 12, wherein said weld seam is void of material of said nonwoven intermediate layer.

14. The flexible, insulative battery cover of claim 12, wherein said flexible, tubular wall has a plurality of living hinges extending from said bottom end to said top end.

15. The flexible, insulative battery cover of claim 1, wherein said reflective outermost thermoplastic layer is a metallized thermoplastic layer.

\* \* \* \* \*